(12) United States Patent
Sega et al.

(10) Patent No.: US 7,580,221 B2
(45) Date of Patent: Aug. 25, 2009

(54) MAGNETIC DISK DRIVE WITH COMPENSATION AGAINST DISTURBANCE

(75) Inventors: Masahiko Sega, Kanagawa (JP); Yoshio Soyama, Kanagawa (JP); Takashi Kouno, Ibaraki (JP); Toshihiro Arisaka, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 604 days.

(21) Appl. No.: 11/106,175

(22) Filed: Apr. 13, 2005

(65) Prior Publication Data
US 2005/0231850 A1    Oct. 20, 2005

(30) Foreign Application Priority Data
Apr. 16, 2004    (JP)    ............... 2004-121340

(51) Int. Cl.
*G11B 33/14* (2006.01)
(52) U.S. Cl. .................................. 360/97.02
(58) Field of Classification Search ........................ None
See application file for complete search history.

(56) References Cited

U.S. PATENT DOCUMENTS 5,426,545 A    6/1995  Sidman et al.
5,757,580 A *  5/1998  Andress et al. .......... 360/97.02
5,923,487 A *  7/1999  Carlson et al. ................ 360/60
6,593,855 B2 *  7/2003  Fujino et al. ................. 340/683
6,597,532 B1 *  7/2003  Usui et al. ................ 360/97.03

FOREIGN PATENT DOCUMENTS

| JP | 02179479 A | * | 7/1990 |
| JP | 2000097730 A | * | 4/2000 |
| JP | 2001-291348 |  | 10/2001 |

* cited by examiner

*Primary Examiner*—David D Davis
(74) *Attorney, Agent, or Firm*—Townsend and Townsend and Crew LLP; Darren Gold (57) ABSTRACT

A magnetic disk drive is to be provided wherein oscillations in thrust, conical and translational modes of a spindle caused by disturbance are to be damped to diminish a positioning error and thereby attain a high recording density and improved accessing performance. In one embodiment, there is provided a compensation circuit using acceleration or angular acceleration sensors, the sensors being disposed on a base, a cover or a PCB (printed circuit board) of a magnetic disk drive so that they can detect disturbance effectively, and wherein a mechanical system transfer characteristic of and other parameters in thrust, conical, or translational mode of a spindle are acquired or calculated by a processor and unnecessary oscillation in each mode is compensated. In another embodiment, to measure a transfer characteristic of the spindle in thrust mode and other parameters after installation of the magnetic disk drive in a case, piezoelectric elements are provided as one of oscillating means. The measurement may be made repeatedly at predetermined intervals.

22 Claims, 9 Drawing Sheets

52. Compression or shear type piezoelectric element

52. Compression or shear type piezoelectric

Fig.6 (b)

Wall which undergoes a force

Oscillating direction

Fig.7

MAGNETIC DISK DRIVE WITH COMPENSATION AGAINST DISTURBANCE

CROSS-REFERENCES TO RELATED APPLICATIONS

This application claims priority from Japanese Patent Application no. JP2004-121340, filed Apr. 16, 2004, the entire disclosure of which is incorporated herein by reference.

BACKGROUND OF THE INVENTION

The present invention relates to a technique for preventing deterioration in positioning accuracy of a magnetic head caused by disturbance. In particular, the present invention is concerned with a magnetic disk drive wherein compensation against disturbance is made by an electronic circuit using sensors.

Magnetic disk drives are required to improve their recording density for increasing their recording capacity. To meet this requirement, it is important how accurately a magnetic head is to be moved to a predetermined position over a magnetic disk medium and allowed to follow a track.

The following are mentioned as factors which impede the positioning accuracy: 1) a slider which carries a magnetic head thereon is influenced by wind created with rotation of a magnetic disk medium, 2) a carriage and another mechanism which support the magnetic head and conduct it to a position over the magnetic disk medium oscillate as a magnetic head positioning operation is performed, and 3) the exertion of an external shock on the magnetic disk drive concerned.

Of these problems, 1) and 2) are concerned with the interior of the magnetic disk drive and could be solved to a certain extent. However, as to 3), it was difficult to solve because it strongly depends on the environment in which the magnetic disk drive is used and the casing, or case, in which it is installed.

In a magnetic disk drive, oscillation generated during seek increases because the access time for stored data is shortened. Under the condition in which plural magnetic disk drives are installed in a case of a server or any other host system, there occurs disturbance in one magnetic disk drive due to operation of the other magnetic disk drive(s).

On the other hand, for the reduction in size and weight of the host system, the rigidity of the case which holds the magnetic disk drives is difficult to be enhanced beyond a certain limit. Thus the conventional oscillation damping effect using an electronic circuit has encountered a limit.

In connection with controlling the positioning of a magnetic head, a technique of detecting an angular acceleration of a mechanical portion (hereinafter referred to as necessary as "Head Disk Assembly" or "HAD") of a magnetic disk drive and performing feedback of the acceleration to diminish tracking errors caused by shock or oscillation is disclosed, for example, in U.S. Pat. No. 5,426,545 and Japanese Patent Laid-Open No. 2001-291348.

In such a conventional example, for example when a magnetic disk drive is placed on a desk with its widest sides facing up and down, a rotation parameter and gain in a direction running along the desk surface are detected using a sensor and are compensated.

More particularly, in a mode in which the whole of the magnetic disk drive rotates as a rigid body within the desk upper surface, a target track on the magnetic disk medium undergoes a positional displacement according to rotation of the entire magnetic disk drive, whereas an actuator which supports the magnetic head does not rotate due to inertia and tends to stay as it is, with consequent occurrence of a positioning error. This error is compensated in the conventional example, in which, however, consideration is given to only the rotation within the desk upper surface.

There are the following oscillation modes of a magnetic disk drive which occur upon exertion of oscillation on the magnetic disk drive from the exterior. However, it is not that all of the following oscillations are compensated effectively in the prior art.

(1) Thrust Mode of Spindle

In this oscillation mode, an oscillation system using as mass a spindle for rotating a magnetic disk medium and using as spring elements a bearing rigidity in a thrust direction of the spindle and rigidity in a thrust direction of a base is excited by a translational disturbance component acting in a direction perpendicular to the surface of the magnetic disk medium.

(2) Conical Mode of Spindle

This is an oscillation mode in a spindle falling direction in which an oscillation system using an inertia of a spindle as mass and using as a spring element a bearing rigidity in a radial direction of the spindle is excited when a base receives a rotational component of disturbance in an out-of-plane direction of the magnetic disk medium. The "out-of-plane direction" indicates a direction including a component perpendicular to the medium surface (this also applies to the following).

(3) Translation Mode of Spindle

In this oscillation mode, an oscillation system using a spindle as mass and using as a spring element a bearing rigidity in a radial direction of the spindle is excited by a translational disturbance acting in a direction parallel to the surface of the magnetic disk medium. In a spindle of a cantilevered structure, there occurs a flexural deformation of a spindle shaft and therefore a conical mode of the spindle is also excited even by a translational disturbance acting in a direction parallel to the surface of the magnetic disk medium.

(4) In-Plane Rotation Mode Using the Whole of Magnetic Disk Drive as Rigid Body

In this oscillation mode, an oscillation system using as mass a rotational inertia of the whole of a magnetic disk drive and using as a spring element the space between the magnetic disk drive and a case which carries the magnetic disk drive thereon, in a plane of a magnetic disk medium, is excited by another, adjacent magnetic disk drive.

BRIEF SUMMARY OF THE INVENTION

With the prior art, it has been impossible to compensate the above thrust mode, conical mode and translation mode of the spindle. One countermeasure so far adopted is to enhance the damping performance for thrust, conical and translation modes of the spindle, and another countermeasure so far adopted is to increase the weight of the entire HDA and to make the moment of inertia large thereby decreasing an acceleration or angular acceleration developed in HDA even under the same disturbance.

It is a feature of the present invention to compensate oscillation in each of thrust, conical and translation modes of a spindle in a magnetic disk drive and thereby remedy the deterioration in positioning accuracy of a magnetic head. It is another feature of the present invention to measure individually each transfer characteristic of thrust, conical and translation modes whose oscillation characteristics vary between cases, and use the measured values in compensation.

In accordance with an aspect of the present invention, there is provided a compensation circuit using acceleration or angular acceleration sensors, the sensors being disposed on a base, a cover, or a PCB (an abbreviation for Printed Circuit Board) of the magnetic disk drive, so that they can detect disturbance effectively, and wherein a mechanical system transfer characteristic and other parameters in thrust, conical, or translation mode of the spindle are acquired or calculated by means of a processor and unnecessary oscillation in each mode is compensated.

Oscillation in the thrust mode can be compensated if there is obtained an acceleration of the base perpendicular to a magnetic disk medium (acceleration in Z-axis direction and how to take coordinate axes will be described later).

Oscillation in the conical mode can be compensated if there are obtained an angular acceleration around X axis and an angular acceleration around Y axis in the case where X and Y axes are taken in a plane of the magnetic disk medium.

In the conical mode, for example during rotation of the spindle, the rotating spindle undergoes a falling force around Y axis under a gyro effect due to the generation of an angular acceleration around X axis taken on the base.

A transient oscillation phenomenon developed under this relation gives rise to such an oscillation as causes the spindle during rotation to fall around X axis after the lapse of a predetermined time.

Therefore, detecting rotational disturbances around the two X and Y axes is higher in detection sensitivity and superior in compensation accuracy. If accuracy may be sacrificed, detection of a rotational disturbance around only one axis will do.

Oscillation in the translation mode can be detected mainly by oscillating the spindle in an in-plane direction of the magnetic disk medium and therefore can be detected in terms of acceleration in X-axis direction, acceleration in Y-axis direction, and angular acceleration in Z-axis direction. The angular acceleration around Z axis is an angular acceleration around the center of gravity of the magnetic disk drive (hereinafter referred to as necessary as "HDD") and is used to detect that the spindle is oscillated. Also in the prior art, the angular acceleration around Z axis compensates a rigid, in-plane rotation mode of the whole of a magnetic disk drive.

In accordance with another aspect of the invention, to measure a transfer characteristic and other parameters in the thrust mode of the spindle after installation of the magnetic disk drive in a case, piezoelectric elements are provided as one of the oscillating mechanisms. The measurement may be made repeatedly at predetermined intervals. This is because the compensation accuracy against disturbance can be improved.

At the time of shipping of the magnetic disk drive, an initial value of a transfer characteristic of the mechanical system may be appropriately set and provided to the magnetic disk drive as is the case with omission of piezoelectric elements and other oscillating mechanisms.

Thereafter, the magnetic disk drive installed in a case of uncertain rigidity causes its own oscillating mechanisms to operate and measures parameters, which can be applied to itself.

As a result, the magnetic disk drive can adapt itself to a transfer characteristic in a state in which it is installed in an actual case from a transfer characteristic in a state different from the initially set value. Therefore, it is possible to expect improvement of the oscillation compensating accuracy.

Since disturbance in each of thrust, conical and translation modes of the spindle is measured by a predetermined sensor and the magnetic disk drive itself can calculate and hold a transfer characteristic of the mechanical system in each mode, there is obtained an effect that the deterioration in positioning accuracy of the magnetic head in each mode can be compensated.

Since the magnetic head is improved in its seek and follow-up characteristic, the data access performance is improved.

Since the magnetic disk drive itself executes disturbance measurement, etc. as necessary after being installed in a case of a host system, it is possible to effect compensation while following changes with time in transfer characteristic after installation of the magnetic disk drive into the case. Consequently, it becomes easy to maintain a high oscillation compensating accuracy of the magnetic disk drive in the host system.

BRIEF DESCRIPTION OF THE DRAWINGS

FIG. 5($a$) is a side view showing an example of a method for mounting both compression type and shear type piezoelectric elements on the bottom of the base.

FIG. 5($b$) is a side view of FIG. 5($a$) as seen from another side face.

FIG. 5($c$) is a side view showing an example of mounting two compression type piezoelectric elements on the bottom of the base.

FIG. 5($d$) is a side view of FIG. 5($c$) as seen from another side face.

FIG. 5($e$) illustrates an example of mounting positions of piezoelectric elements on the bottom of the base.

FIG. 6($a$) is a side view showing an example of mounting both compression type and shear type piezoelectric elements on a side face of the base.

FIG. 6($b$) is a side view of FIG. 6($a$) as seen from another side face.

FIG. 6($c$) is a side view showing an example of mounting two compression type piezoelectric elements on a side face of the base.

FIG. 6($d$) is a side view of FIG. 6($c$) as seen from another side face.

FIG. 6($e$) illustrates an example of mounting positions of piezoelectric elements on a side face of the base.

DETAILED DESCRIPTION OF THE INVENTION

Figure 1:
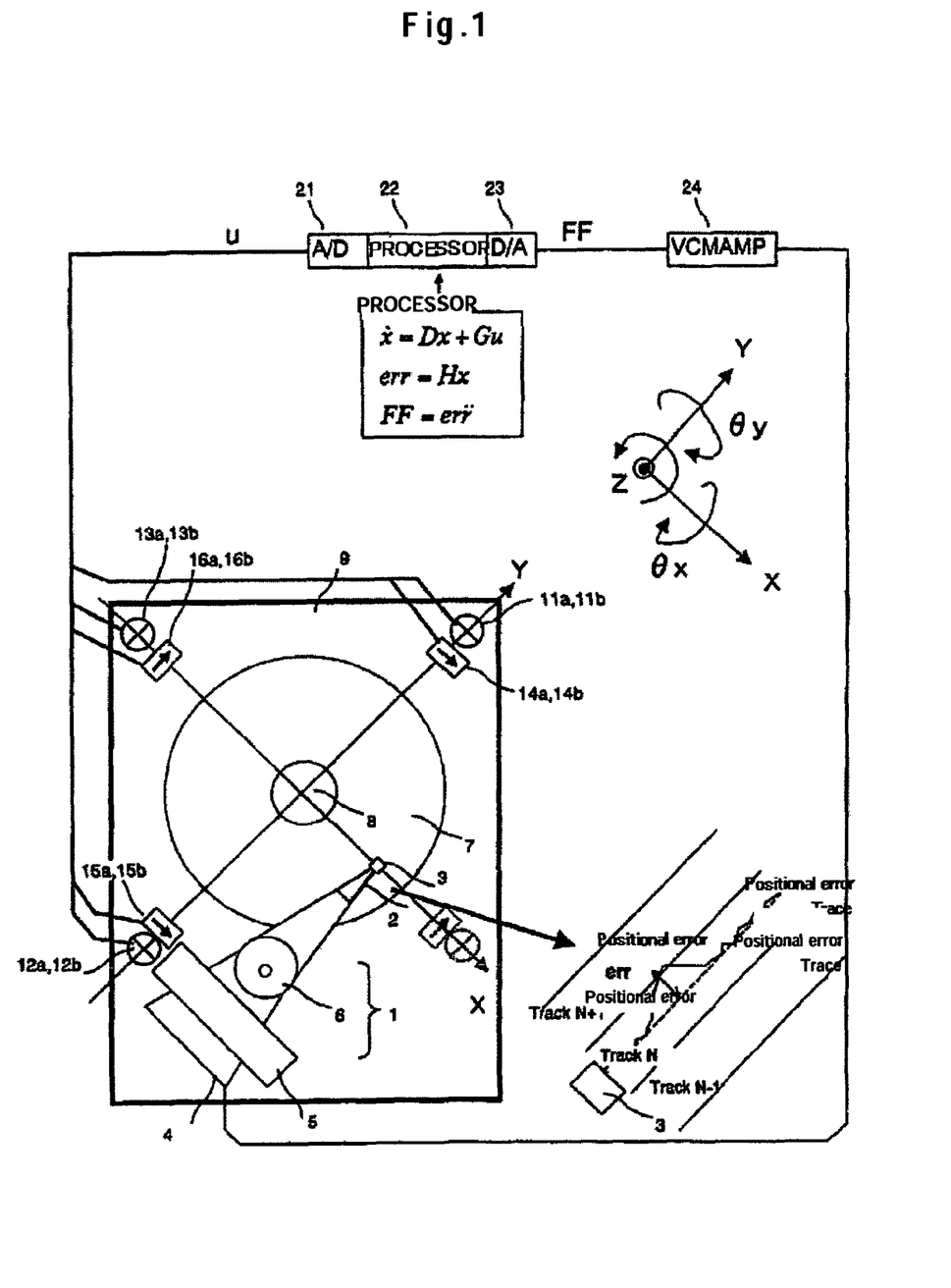
FIG. 1 illustrates a magnetic disk drive to which the present invention is applied, overlooking the interior of the magnetic disk drive with a cover opened.
Figure 3:
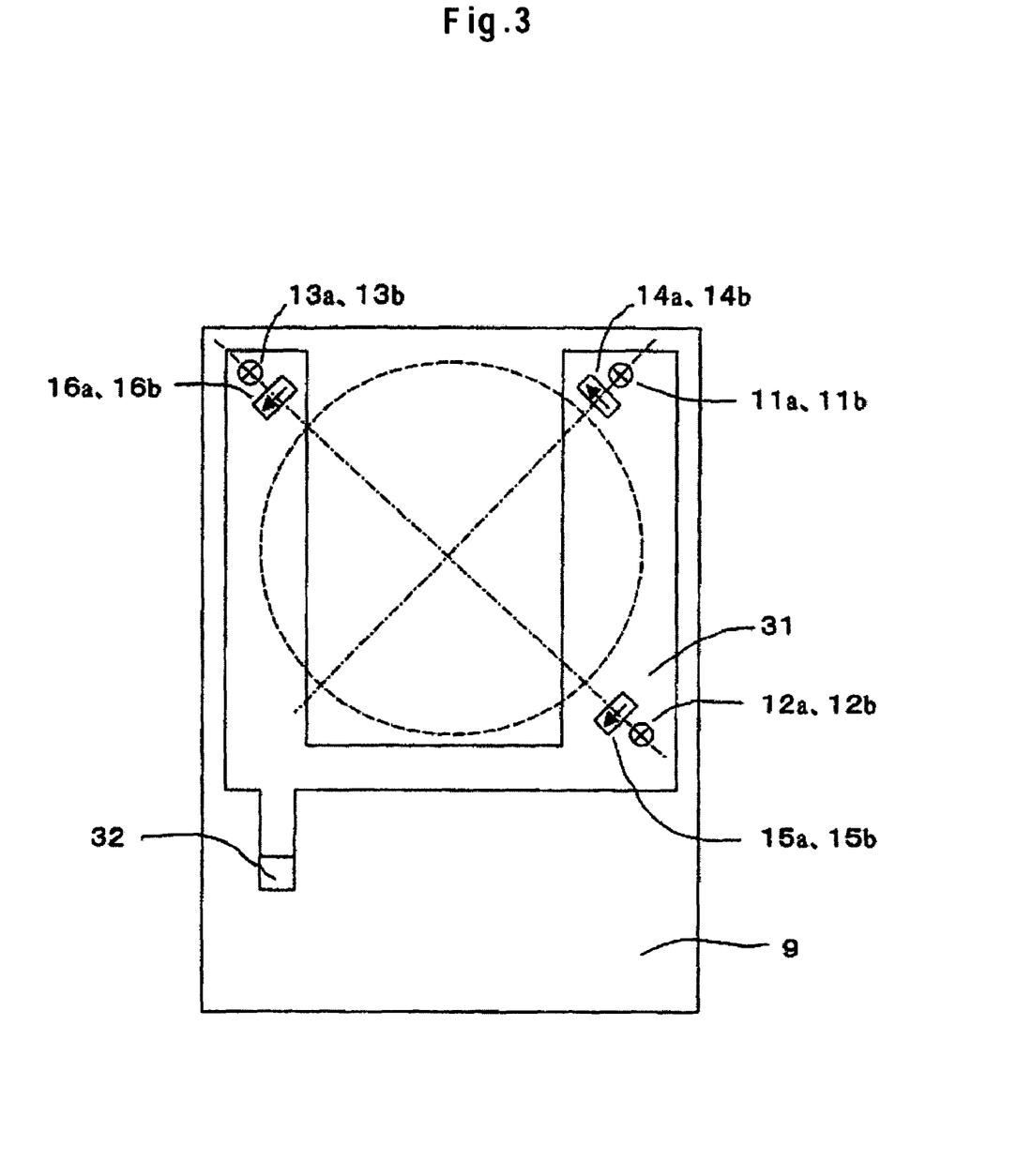
FIG. 3 illustrates a method for mounting sensors or piezoelectric elements on a base 9 as seen from the back side with a printed circuit board of the magnetic disk drive removed.
Figure 7:
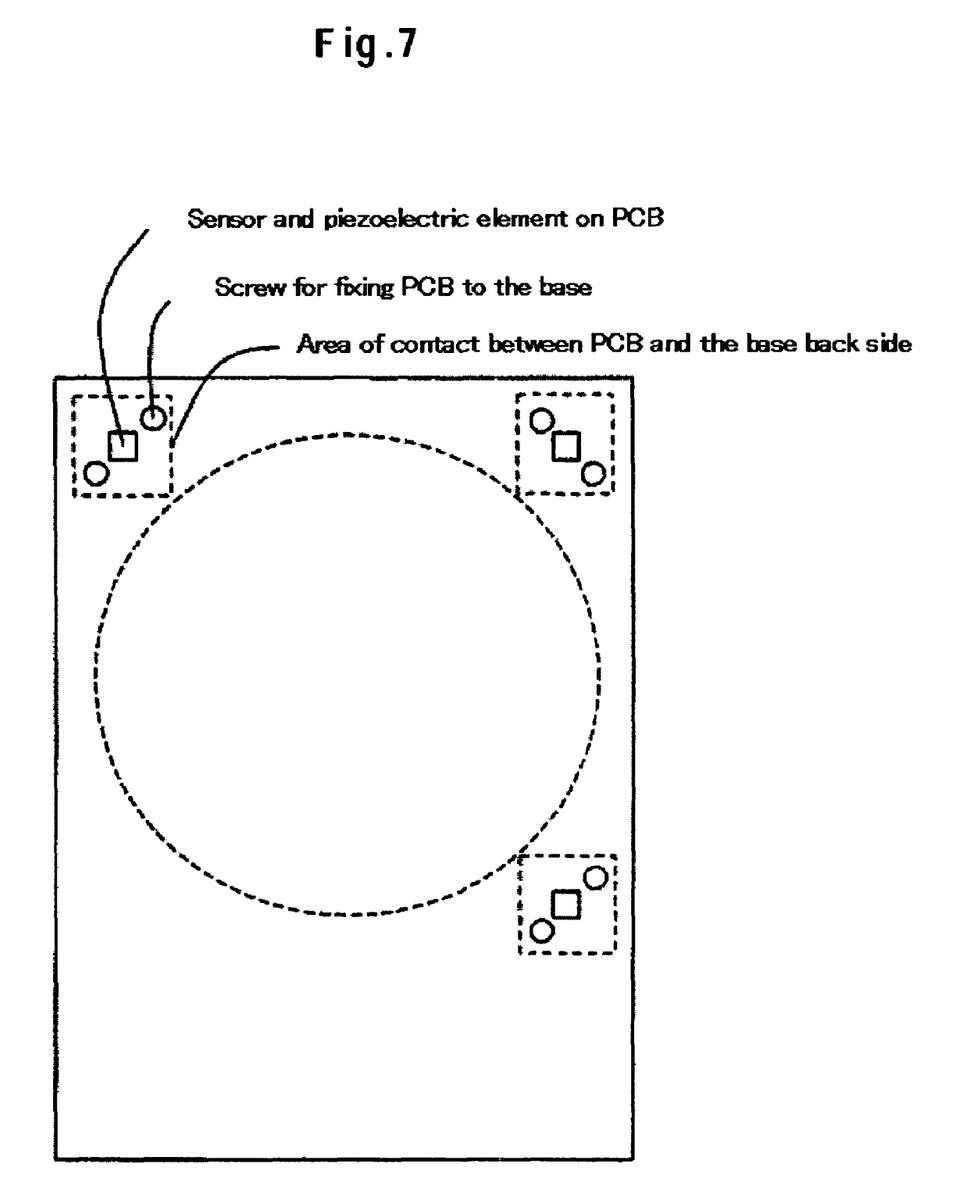
FIG. 7 illustrates another example of mounting positions of sensors and piezoelectric elements.

Piezoelectric elements and other sensors are arranged as shown in FIG. 1, 3, or 7. Embodiments of the present invention will be described briefly hereinunder with reference to the accompanying drawings.

FIRST EMBODIMENT

FIG. 1 is a conceptual diagram of a magnetic disk drive to which the present invention is applied, overlooking the interior of the magnetic disk drive with a cover opened.

A slider 3 which carries a magnetic head (not shown) thereon is attached to a tip end of an actuator 1 through a suspension 2. By passing an electric current in a coil 4, a force is developed between a VCM 5 and the coil 4 and the actuator 1 moves pivotally about a bearing portion 6 to locate the slider 3 at an arbitrary radial position over a magnetic disk medium 7 mounted on a spindle motor 8. The actuator 1 and the spindle motor 8 are installed on a base 9.

Coordinates are determined in the following manner, assuming that the slider 3 is flying at an approximately central position (middle periphery) between inner- and outermost peripheries over a data area of the magnetic disk medium 7.

Since the slider 3 pivots about the bearing portion 6, a tangential direction thereof is assumed to be X axis. In FIG. 1, the X axis passes through the center of the spindle motor 8, depending on the length of an arm of the actuator 1. Then, Y axis is taken so as to pass through the center of the spindle motor 8 perpendicularly to X axis. Further, Z axis and angles θx, θy, θz around the axes are determined as in FIG. 1 or 2. How to take coordinate axes is not limited to this method, but there may be adopted another method.

Acceleration sensors 11a, 12a and piezoelectric elements 11b, 12b having sensitivity in an out-of-plane direction are disposed at positive and negative positions with respect to an origin (the center of the motor 8) on Y axis and near a frame of the base 9. Also disposed in such positions are acceleration sensors 14a, 15a and piezoelectric elements 14b, 15b having sensitivity in an in-plane X axis direction.

Further, an acceleration sensor 13a and a piezoelectric element 13b both having sensitivity in an out-of-plane direction and an acceleration sensor 16a and a piezoelectric element 16b both having sensitivity in an in-plane Y axis direction are disposed at a negative position on X axis and near the frame of the base 9.

The reason why the acceleration sensors and the piezoelectric elements are disposed near the frame of the base 9 is that it is intended to minimize the influence of out-of-plane oscillation of the base 9 and thereby enhance the purity of detected signals.

To increase an oscillating force, a counter mass (not shown) is attached to each of the piezoelectric elements on the side opposite to the end portion fixed to the base 9.

With the three acceleration sensors 11a, 12a and 13a having sensitivity in an out-of-plane direction, it is possible to determine a Z-axis translational acceleration, an angular acceleration around X axis and an angular acceleration around Y axis of the base 9 based on disturbance.

With the three acceleration sensors 14a, 15a and 16a having sensitivity in an in-plane direction, there are determined an angular acceleration around Z axis, an X-axis translational acceleration and a Y-axis translational acceleration. As to the Y-axis translational acceleration, since there is only one sensor in Y direction, it is determined from the acceleration sensor 16a taking the angular acceleration around Z axis into account. To determine an angular acceleration around Y axis, if another acceleration sensor having sensitivity in an out-of-plane direction is present on the positive side of X axis, it is possible to ensure a spacing from the acceleration sensor 13a and enhance the detection accuracy.

Figure 2:
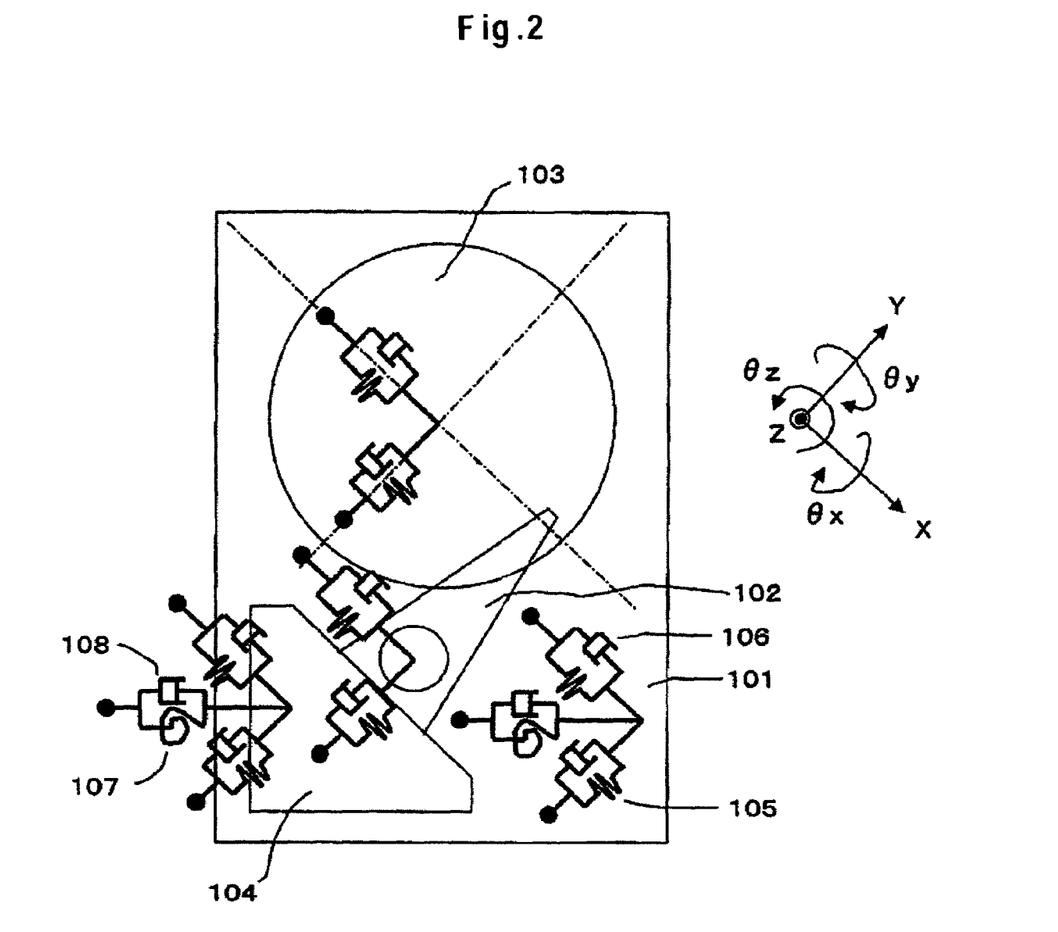
FIG. 2 illustrates an oscillation model of a head disk assembly in the magnetic disk drive shown in FIG. 1.

The oscillation model of HDA shown in FIG. 1 can be converted, for example, to such a model as shown in FIG. 2. The model of FIG. 2 is illustrated as a model in a two-dimensional plane to make it easier to see. Therefore, equivalent rigidity, equivalent damping, equivalent rotational rigidity, and equivalent rotational damping in Z direction are omitted.

With respect to each of a base 101, a carriage 102, a spindle motor 103 and a VCM 104 as constituents of the HDA, if displacements in orthogonal coordinates are assumed to be x, y, z and angles around the axes are assumed to be θx, θy, θz, it is possible to establish an equation of motion in these six directions.

In FIG. 2, the numerals 105, 106, 107, and 108 represent equivalent rigidity, equivalent damping, equivalent rotational rigidity, and equivalent rotational damping, respectively, of each element.

$$M_1 A_1 \ddot{x}_1 + T_1^T C_1 T_1 (A_1 \dot{x}_1 - B_1 \dot{x}_4) + T_1^T K_1 T_1 (A_1 x_1 - B_1 x_4) = f_1 \quad (1)$$

$$M_2 A_2 \ddot{x}_2 + T_2^T C_2 T_2 (A_2 \dot{x}_2 - B_2 \dot{x}_4) + T_2^T K_2 T_2 (A_2 x_2 - B_2 x_4) = f_2 \quad (2)$$

$$M_3 A_3 \ddot{x}_3 + T_3^T C_3 T_3 (A_3 \dot{x}_3 - B_3 \dot{x}_4) + T_3^T K_3 T_3 (A_3 x_3 - B_3 x_4) = f_3 \quad (3)$$

$$M_4 \ddot{x}_4 + T_4^T C_4 T_4 \dot{x}_4 + T_4^T K_4 T_4 x_4 = \quad (4)$$
$$f_4 + T_1^T C_1 T_1 (A_1 \dot{x}_1 - B_1 \dot{x}_4) + T_1^T K_1 T_1 (A_1 x_1 - B_1 x_4) +$$
$$T_2^T C_2 T_2 (A_2 \dot{x}_2 - B_2 \dot{x}_4) + T_2^T K_2 T_2 (A_2 x_2 - B_2 x_4) +$$
$$T_3^T C_3 T_3 (A_3 \dot{x}_3 - B_3 \dot{x}_4) + T_3^T K_3 T_3 (A_3 x_3 - B_3 x_4)$$

In the above equations, the subscripts 1, 2, 3, and 4 represent parameters of the base 101, carriage 102, spindle motor 103, and VCM 104, respectively.

Likewise, xi stands for a displacement vector of each element, Mi stands for mass, Ci stands for damping (including a gyro term in the spindle motor 103), Ki stands for a rigidity matrix, Ti stands for a transformation matrix which depends on a centroid position of each element, $Ti^T$ stands for a transposed matrix thereof, Ai and Bi stand for a coordinate transformation matrix, f4 stands for disturbance exerted on HDA from the exterior, and f1, f2 and f3 stand for disturbance developed with thrust of the actuator. Further, i stands for a natural number of 1 to 4.

The above equations (1) to (4) can be combined into the following equation of motion of HDA:

$$M\ddot{x} + C\dot{x} + Kx = F \quad (5)$$

$$x = \{x_1, x_2, x_3, x_4\}^T, F = \{f_1, f_2, f_3, f_4\}^T$$

If in each element there is used a degree of freedom in a maximum of six directions, this equation of motion becomes an equation having twenty-four degrees of freedom.

The following equation of state can be obtained from the equation of motion (5):

$$\dot{x} = Dx + Gu \quad (6)$$

$$err = Hx$$

$$G = \{O, M^{-1}\}^T$$

$$D = \begin{bmatrix} O & E \\ -M^{-1}K & -M^{-1}C \end{bmatrix}$$

$$x = \{x, \dot{x}\}^T$$

An input vector u contains a disturbance force F as a vector component. Actually, the disturbance force F corresponds to the product obtained by multiplying acceleration sensor outputs by mass and moment of inertia of HDA. The disturbance force F can be detected from outputs of the acceleration sensors (11*a* to 16*a*). Therefore, the following equation can be obtained using a matrix U which makes transformation into a six-direction force component u from acceleration outputs of the sensors:

$$u = U\{11a, 12a, 13a, 14a, 15a, 16a\}^T \quad (7)$$

In equation (6), err stands for a positional error between the magnetic head and a target position on the magnetic disk medium 7.

In this connection, an example of transient response is shown on a right lower side of FIG. 1. Since the resonance frequency of the actuator is sufficiently high, this state can be regarded substantially as the state of an inertia body. Therefore, a transfer function from an output of a digital/analog (D/A) converter 23 up to the positional error of the magnetic head can be represented by the following equation (8):

$$FF = d^2(err)/dt^2 \quad (8)$$

where FF stands for an output of D/A 23. Therefore, if the positional error is subjected to differential of second order, there is calculated FF which cancels the positional error.

That is, in equation (6), six components as sensor outputs are inputted and the amount of positional error, err, is calculated. Thereafter, the err is subjected to differential of second order in accordance with the equation (8) to calculate FF, which is then inputted to a VCMAMP 24. As a result, it is possible to effect feedforward compensation which cancels a positional error generated by an acceleration disturbance applied from the exterior.

More specifically, the calculations of equations (6), (7) and (8) are executed by a processor and FF signal is applied to the VCMAMP from D/A 23.

In equation (6), H stands for a matrix for transformation into a relative displacement between the magnetic head and the magnetic disk medium 7. The equation (6) is obtained theoretically on the basis of geometrical positions of elements, clamping rigidity between elements, and damping.

SECOND EMBODIMENT

Next, the magnetic disk drive is installed in a suitable case and is brought into a state of actual use, then various parameters are measured and the foregoing elements M, C and K are identified by predetermined processings. This will be described below in more detail.

A transfer characteristic to the acceleration sensor outputs and error signal is measured by oscillating the HDA in a state of actual use, followed by curve-fitting and other signal processings to identify the elements of M, C and K. Further, D and G are determined using equation (6).

To enhance the accuracy in such an identification it is ideally desirable to perform oscillation in six directions and curve-fit plural transfer functions. Although x is modeled in terms of a rigidity displacement of each element, in direct identification by oscillation in a state of actual use, for example a base deformation and other deformations not assumed in the oscillation model can be compensated if there is a peak in the transfer functions.

Identification of the elements may be done when the magnetic disk drive is installed in the case or just after turning ON of the spindle motor in the magnetic disk drive.

In FIG. 1, a six-component output from the sensors is inputted to a processor 22 through the analog/digital (A/D) converter 21. Information necessary for oscillation compensation of modal parameters with respect to six-direction dynamic components and mechanical resonance.

As to the force component in Z-axis direction, there appears conspicuously a spindle thrust mode which is a continuous mode of out-of-plane deformations of spindle 10 and base 9 comprising the rotating portion of the spindle motor 8 constituted by clamp and other clamping components and the magnetic disk medium 7. By identifying a modal parameter of this mode and incorporating it into D and G it is possible to effect compensation more accurately.

As to the force components around X and Y axes, a conical mode of the spindle 10 appears conspicuously, so that a modal parameter of the conical mode is identified.

As to the force components in X- and Y-axis directions, a translational mode and a conical mode (in the case of a cantilevered spindle) of the spindle 10 appear conspicuously and therefore modal parameters of these modes are identified.

As to the force component around Z axis, since it corresponds to a rigid, angular acceleration of the base 9 in the case where the center of the spindle and that of a rotational motion are coincident with each other, and therefore it is possible to effect compensation by the conventional method without using the processor. On the other hand, if both centers are not coincident with each other, an oscillating force enters the spindle under a rigid rotation of the base and both translation mode and conical mode (in the case of a cantilevered spindle) of the spindle come to appear, therefore, these modes are also taken into account.

A positioning error caused by disturbances in and around X-, Y- and Z-axis directions entering the base 9 is compensated by the processor.

The compensation signal FF is outputted from the digital/analog converter D/A 23 and is converted into a compensation operating current in the VCMAMP 24, which current then flows in the coil 4 to compensate the positioning error caused by disturbance.

Disturbance which enters the base is generated by not only a force caused by seek of another HDD but also a force developed when the HDD concerned seeks. Compensating this disturbance means that a residual oscillation in seek settling, which is developed by a couple of a seek force generated during seek and a seek reaction force which the VCM 5 undergoes, can also be compensated.

The piezoelectric elements described above are used for improving the compensation accuracy of disturbance (including the residual oscillation in seek settling) on the basis of measurement of transfer characteristics of the mechanical system in thrust, conical and translational modes of the spindle which measurement is made on the case of the magnetic disk drive.

In the case of a magnetic disk drive wherein the oscillation by the piezoelectric elements is not performed, a transfer characteristic is provided beforehand as a default value (a predetermined fixed value) in shipping. As candidates of the default value there are mentioned a characteristic value intermediate between the case where the base 9 is "fixed" and the case where the base 9 is "free" and a measured value obtained in a case of a large disturbance.

The above description has been made using coordinate axes with the slider 3 lying in the middle periphery of the magnetic disk medium 7. If the setting of coordinate axes is changed, a different evaluation of the base rigidity results. Therefore, when the slider 3 is in the inner or outer periphery, the compensation accuracy is deteriorated by an amount corresponding to the angle of the slider. To avoid this inconvenience, if there is a sufficient memory capacity, compensating operation quantities at different positions are calculated and stored in advance. To save the memory capacity, the inner to the outer periphery of the medium 7 may be divided into plural blocks and compensating operation quantities may be determined.

From the standpoint of trade-off relative to accuracy required, it is possible to omit the following components. At the time of compensating conical and thrust modes of the spindle, the piezoelectric elements having sensitivity in an out-of-plane direction may be omitted up to one if there are three out-of-plane sensors.

During rotation of the spindle, the force of a gyro component acts on a rotational external force around X axis, so that the spindle tends to fall around Y axis. Therefore, the acceleration sensor on X axis may be omitted while the acceleration sensor on Y axis is allowed to remain.

During seek of the carriage, there occurs a residual oscillation of translational mode and conical mode of the spindle due to a coupling of a seek force of the coil and a seek reaction force which the VCM undergoes. Since this oscillating force acts in the seek direction of the carriage, the transfer characteristic of the mechanical system can be measured by oscillating the coil 4 of VCM. Consequently, the piezoelectric elements 14b and 15b in X-axis direction may be omitted.

As to the angular accelerations around X, Y and Z axes, they can also be measured using an angular acceleration sensor. Since the use of a single angular acceleration sensor permits the measurement, it is possible to prevent deterioration of the measurement accuracy caused by variations in the use of two translational acceleration sensors.

THIRD EMBODIMENT

FIG. 3 illustrates a method for mounting sensors or piezoelectric elements in a further embodiment. FIG. 3 is a view of the base 9 as seen from the back side with PCB of the magnetic disk drive removed. The same reference numerals as in FIG. 1 represent the same components as in FIG. 1.

Acceleration sensors and piezoelectric elements are mounted on an FPC 31 (Flexible Printed Circuit, a flexible printed circuit board 31, hereinafter referred to as necessary as "FPC") and are fixed firmly to the base 9 to measure oscillation of the base. The FPC 31 is connected to a connector 32 which is for connection from the base 9 to PCB.

As the piezoelectric element serving as a source of an oscillating force in an out-of-plane direction, a compression type piezoelectric element is suitable.

As the piezoelectric element serving as a source of an oscillating force in an in-plane direction, a shear type piezoelectric element is used, or a compression type piezoelectric element may be used, provided an aperture or a recess is formed in the base 9 and an end portion of FPC 31 is bent at right angles.

Thus, the sensor and piezoelectric element mounting method utilizing FPC 31 is very simple and effective. The acceleration sensors and piezoelectric elements on the FPC shown in FIG. 3 can pick up oscillation of the base in a somewhat accurate manner.

FOURTH EMBODIMENT

If the oscillation detecting accuracy required is low, the acceleration sensors and piezoelectric elements can be mounted on PCB.

The sensors and piezoelectric elements for detecting X-axis translational acceleration, Y-axis translational acceleration and angular acceleration around Z axis in an in-plane direction have a sufficient in-plane rigidity even when mounted on PCB. It is advantageous in point of sensitivity to dispose these sensors and piezoelectric elements near screws and other fixing mechanisms used to fix the PCB to the base 9.

However, to mount the sensors and piezoelectric elements for detecting Z-axis translational acceleration, angular acceleration around X axis and angular acceleration around Y axis in an out-of-plane direction, it is preferable to ensure a sufficient rigidity in the out-of-plane direction by adopting such a construction as shown in FIG. 7.

In FIG. 7, the acceleration sensors and piezoelectric elements are mounted near the positions of screws for fixing PCB to the base and further between the screws. It is preferable that the portion of the PCB on which these sensors and piezoelectric elements are mounted be surface-mounted directly to the base to ensure a sufficient fixing rigidity to the base using adherence elastic member, double-faced adhesive tape, adhesive or other fixing mechanisms to maintain insulation performance of the PCB.

FIFTH EMBODIMENT

Figure 4:
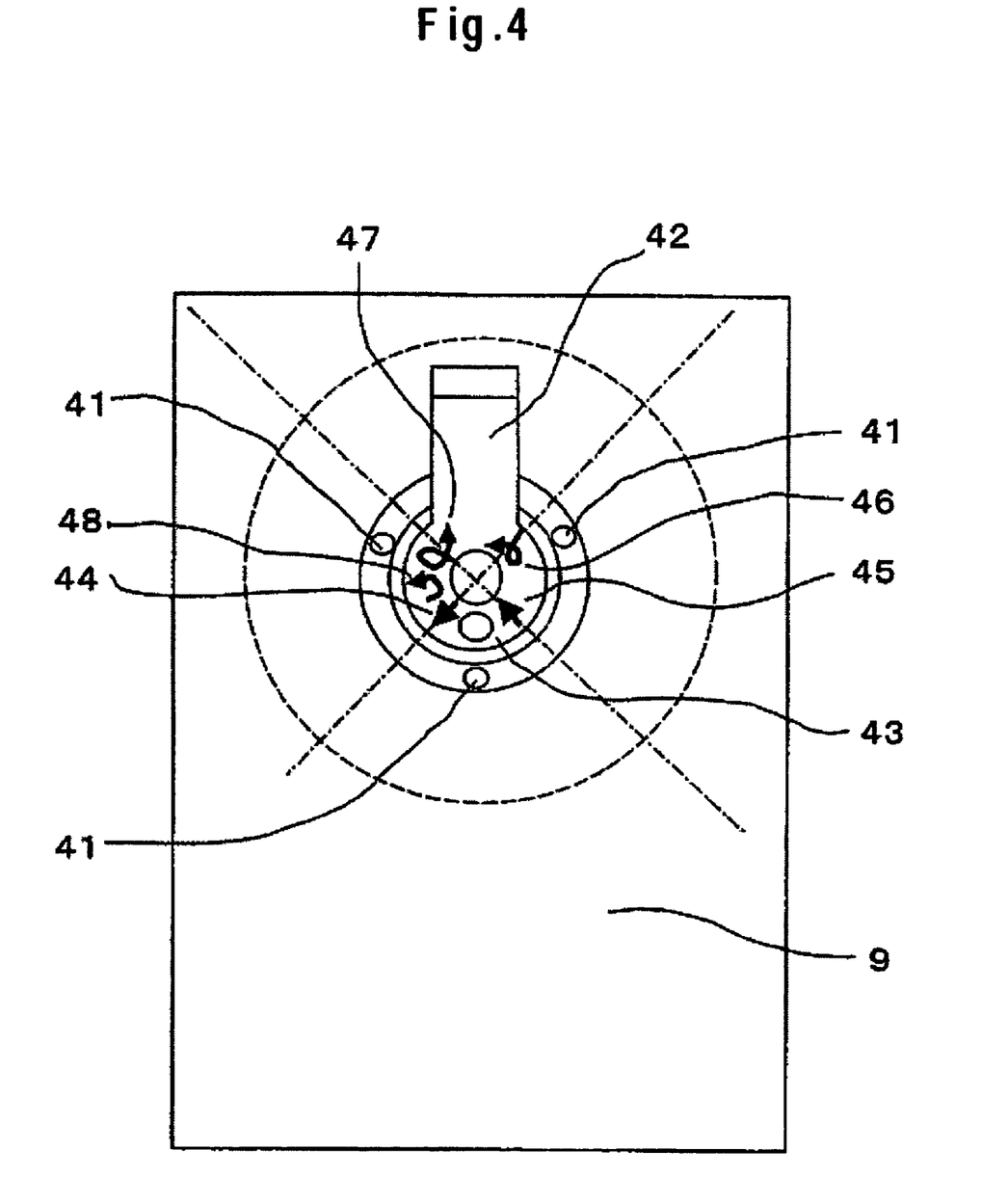
FIG. 4 illustrates another method for mounting sensors or piezoelectric elements at a flange portion of a spindle motor 8 on the base 9 as seen from the back side with the printed circuit board of the magnetic disk drive removed.
Figure 5:
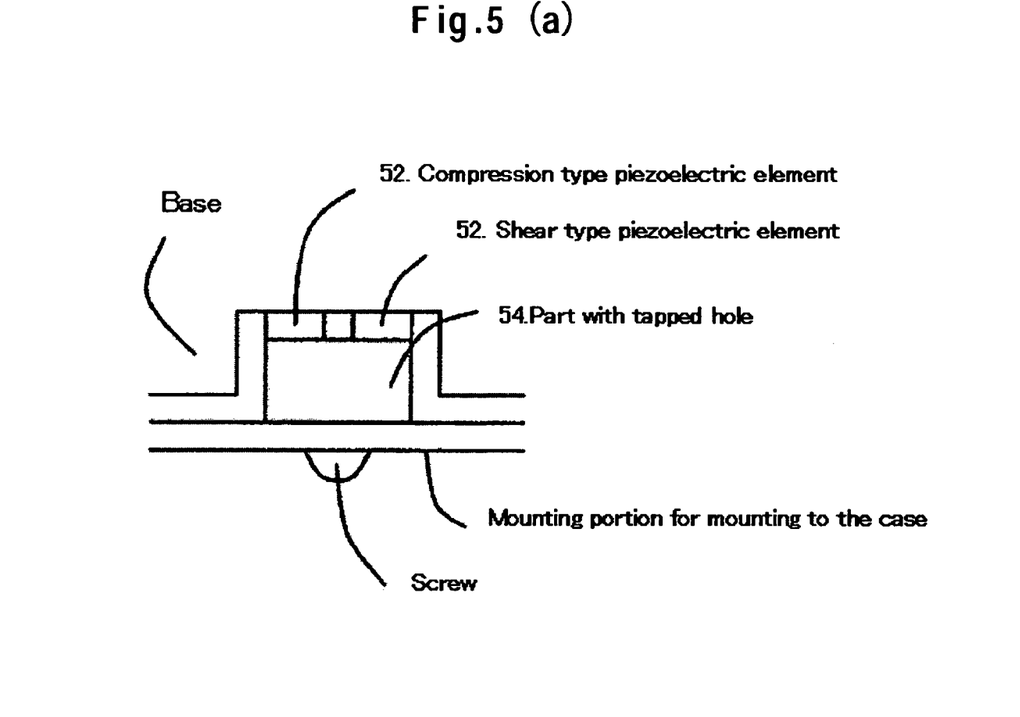
Figure 6:
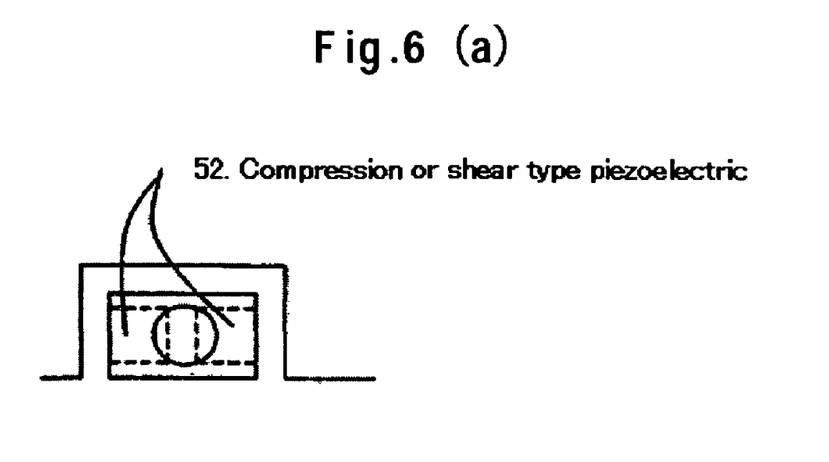

FIG. 4 illustrates a method for mounting sensors or piezoelectric elements in a still further embodiment. FIG. 4 is a view of the base 9 as seen from the back side with PCB of the magnetic disk drive removed, showing a flange portion of the spindle motor 8 and the vicinity thereof. The same reference numerals as in FIG. 1 indicate the same components as in FIG. 1.

A flange portion of the spindle motor 8 is fixed to the base 9 with screws 41. The spindle motor 8 is provided with an FPC 42 (motor FPC) which connects to PCB. A Z direction acceleration sensor 43, an X direction acceleration sensor 44 and a Y direction acceleration sensor 45, which can detect a Z-axis translational acceleration, an X-axis translational acceleration and a Y-axis translational acceleration, respectively, are mounted on the FPC 42.

Also mounted are an around-X-axis angular acceleration sensor 46, an around-Y-axis angular acceleration sensor 47 and an around-Z-axis acceleration sensor 48 which can detect an angular acceleration around X axis, an angular acceleration around Y axis and an angular acceleration around Z axis respectively. Since a part of the FPC 42 can be utilized, it is possible to provide a compact and less expensive mounting structure.

If the diameter of the flange portion of the spindle motor 8 can be made large, the angular acceleration sensors may be substituted by acceleration sensors or piezoelectric elements.

To effectively measure the transfer characteristic of the mechanical system in the magnetic disk drive when installed in a case of a host system, there is mounted an FPC 31 of the shape of FIG. 3 with only piezoelectric elements mounted thereon. Detected values of angular accelerations can be provided to the magnetic disk drive by means of the piezoelectric elements which are arranged with a sufficient span.

SIXTH EMBODIMENT

FIGS. 5(a) to 5(d) and FIGS. 6(a) to 6(d) illustrate a still further example of a method for mounting piezoelectric elements. Each of these figures is a view of the base 9 of HDA as seen from a side face. FIG. 5 illustrates a case where piezoelectric elements 52 are mounted to the bottom of the base 9, while FIG. 6 illustrates a case where piezoelectric elements 52 are mounted to a side face of the base 9. Tapped holes to be used for a user to secure the base 9 of HDA to a case of a host system are formed in four positions of the bottom of the base and in six positions of side faces of the base.

In FIG. 5(a), piezoelectric elements 52 of both compression type and shear type are arranged on one surface sandwiched in between parts 54 with tapped hole and the bottom of the HDA base. The parts 54 with tapped hole are each screwed to a mounting portion for mounting to the case. In FIG. 6(a), two piezoelectric elements 52 of the compression type or the shear type are arranged on one surface sandwiched in between parts 54 with tapped hole and a side face of the HDA base. The parts 54 with tapped hole are each screwed to a mounting position for mounting to the case, which position is not shown lest the figure should become difficult to see.

In FIGS. 5(a) and 6(a), a mounting surface of the piezoelectric elements 52 lies between the part 54 with tapped hole and the base 9. This mounting surface may be set between the parts 54 with tapped hole and the mounting portion for mounting to the case.

In FIG. 5(a), it is necessary to use one compression type piezoelectric element 52 and one shear type piezoelectric element 52. Otherwise, it would be impossible to effect oscillation in both in-plane and out-of-plane directions. In FIG. 6(a), the piezoelectric elements 52 may be either the compression type or the shear type, or one may be the compression type and the other the shear type, insofar as oscillation can eventually be effected in both in-plane and out-of-plane directions.

In FIG. 5(b), which is a side view of FIG. 5(a), a wide mounting area of PCB can be ensured in comparison with FIG. 6(b) because there is no wall that undergoes the force of the piezoelectric elements 52.

In FIG. 6(c), piezoelectric elements 52 of the compression type or the shear type are mounted respectively on two surfaces sandwiched in between parts 54 with tapped hole and the bottom and a side face of the HDA base 9. One of the parts 54 with tapped hole is screwed to a mounting portion for mounting to the case.

In FIG. 6(c), piezoelectric elements 52 of the compression type or the shear type are mounted respectively on two surfaces sandwiched in between parts 54 with tapped hole and the bottom and a side face of the HDA base 9. One of the parts 54 with tapped hole is screwed to a mounting portion for mounting to the case, which position is not shown lest the figure should become difficult to see.

In FIGS. 5(c) and 6(c), a mounting surface of the piezoelectric elements 52 lies between the parts 54 with tapped hole and the base 9. This mounting surface may be set between the parts 54 with tapped hole and the mounting portion for mounting to the case.

It eventually suffices to adopt a combination which can oscillate in both in-plane and out-of-plane directions. However, in FIG. 5(d), which is a side view of FIG. 5(c), a wide mounting area of PCB can be ensured in comparison with FIG. 6(d) because there is no wall that undergoes the force of the piezoelectric elements 52.

According to such a structure, an oscillating mechanism can be mounted on the frame of the base 9 and hence an out-of-plane deformation of the base 9 becomes less influential. In addition, since an oscillating force can be applied efficiently, a modal parameter of the oscillation mode to be compensated can be measured accurately, thus giving rise to the effect that the compensation accuracy is enhanced.

It is desirable that the force of piezoelectric elements 52 be generated in such position and direction as facilitate excitation of an oscillation mode to be compensated.

For example, in the case where oscillation is to be made in six directions, piezoelectric elements 52 are arranged in three positions out of four positions on the bottom (FIG. 5(e)) and in three positions out of six positions on a side face (FIG. 6(e)) so that each ○ mark permits oscillation in an out-of-plane direction and each arrow mark permits oscillation in an in-plane direction, and acceleration sensors having sensitivity in a direction which facilitates detection of oscillation results are disposed.

In the case where oscillation is made at an angle to the frame of the base as in FIGS. 5(e) and 6(e), an inclination of direction or tilting of the parts 54 with tapped hole or of wall is needed in the case of shear type piezoelectric elements.

If the piezoelectric elements as oscillating mechanisms are mounted in the same position and direction as one of mounting positions and directions of plural acceleration sensors, it is possible to acquire modal parameters by the number corresponding to all of the acceleration sensors. For enhancing the accuracy, it is preferable that piezoelectric element-sensor combinations be provided at plural positions.

The present invention is applicable to a magnetic disk drive which is mounted to a server, an external storage device, or any other host system.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive comprising:
   a magnetic disk medium;
   a spindle carrying said magnetic disk medium thereon rotatably;
   a spindle motor configured to impart a rotational drive force to said spindle;
   a magnetic head configured to write or read information to or from said magnetic disk medium;
   a slider carrying said magnetic head thereon;
   a suspension connected to said slider to support the slider;
   a carriage connected to said suspension to support the suspension;
   a coil supported by said carriage;
   an electronic circuit configured to control said spindle motor, said magnetic head, or said coil;
   a sensor to detect an acceleration having a component perpendicular to a surface of said magnetic disk medium; and
   a processor configured to receive outputs of said electronic circuit and said sensor and to provide a compensation signal to the coil based on the outputs of the said electronic circuit and said sensor,
   wherein a positioning error between the magnetic head and a target position is diminished using the output of said sensor.

2. A magnetic disk drive according to claim 1, further comprising a bearing to guide said carriage movably in a radial direction of said magnetic disk medium.

3. A magnetic disk drive according to claim 1, further comprising a base to support said spindle rotatably through a bearing.

4. A magnetic disk drive according to claim 3, further comprising a magnetic circuit paired with said coil to drive said carriage, said magnetic circuit being supported by said base.

5. A magnetic disk drive according to claim 3, further comprising a cover paired with said base to maintain a hermetically sealed condition.

6. A magnetic disk drive according to claim 5, further comprising an FPC or substrate carrying said electronic circuit thereon.

7. A magnetic disk drive according to claim 6, wherein said sensor is fixed to said base, said cover, or said FPC or said substrate.

8. A magnetic disk drive according to claim 1, wherein the output of said sensor is inputted and subjected to transformation, then an electric current is added to said coil.

9. A magnetic disk drive comprising:
a magnetic disk medium;
a spindle carrying said magnetic disk medium thereon rotatably;
a spindle motor configured to impart a rotational drive force to said spindle;
a magnetic head configured to write or read information to or from said magnetic disk medium;
a slider carrying said magnetic head thereon;
a suspension connected to said slider to support the slider;
a carriage connected to said suspension to support the suspension;
a coil supported by said carriage;
an electronic circuit configured to control said spindle motor, said magnetic head, or said coil;
a sensor to detect an acceleration;
an oscillating mechanism configured to provide the acceleration; and
a processor configured to:
control said oscillating mechanism by sending one or more electrical signals to the oscillating mechanism to cause the oscillating mechanism to oscillate, thereby creating the acceleration;
receive outputs of said electronic circuit and said sensor while the oscillating mechanism is oscillating; and
calculate a transfer characteristic of the magnetic disk drive caused by the acceleration based on the outputs of said electronic circuit and said sensor.

10. A magnetic disk drive according to claim 9, further comprising a bearing to guide said carriage movably in a radial direction of said magnetic disk medium.

11. A magnetic disk drive according to claim 9, further comprising a base to support said spindle rotatably through a bearing.

12. A magnetic disk drive according to claim 11, further comprising a magnetic circuit paired with said coil to drive said carriage, said magnetic circuit being supported by said base.

13. A magnetic disk drive according to claim 11, further comprising a cover paired with said base to maintain a hermetically sealed condition.

14. A magnetic disk drive according to claim 13, further comprising an FPC or substrate carrying said electronic circuit thereon.

15. A magnetic disk drive according to claim 14, wherein said oscillating mechanism is fixed to said base, said cover, or said FPC or said substrate.

16. A magnetic disk drive according to claim 14, wherein a part of said oscillating mechanism is interposed between said base, said cover, or said FPC or said substrate, and a case which carries the magnetic disk drive thereon.

17. A magnetic disk drive according to claim 9, wherein a part of said oscillating mechanism has a counter mass on the side opposite to a fixed end portion of the oscillating mechanism.

18. A magnetic disk drive according to claim 9, wherein the oscillating mechanism comprises one or more piezoelectric elements.

19. A magnetic disk drive according to claim 18, wherein the one or more piezoelectric elements are mounted in the same position and direction as the sensor.

20. A magnetic disk drive comprising:
a magnetic disk medium;
a spindle carrying said magnetic disk medium thereon rotatably;
a spindle motor configured to impart a rotational drive force to said spindle;
a magnetic head configured to write or read information to or from said magnetic disk medium;
a slider carrying said magnetic head thereon;
a suspension connected to said slider to support the slider;
a carriage connected to said suspension to support the suspension;
a coil supported by said carriage;
an electronic circuit configured to control said spindle motor, said magnetic head, or said coil;
a sensor to detect an acceleration;
oscillating means for providing the acceleration; and
a processor configured to:
control said oscillating means by sending one or more electrical signals the oscillating means to cause the oscillating means to oscillate;
receive outputs of said electronic circuit and said sensor while the oscillating means is oscillating; and
calculate a transfer characteristic of the magnetic disk drive caused by the acceleration based on the outputs of said electronic circuit and said sensor.

21. A magnetic disk drive according to claim 9, wherein the processor is further configured to calculate a transfer characteristic when the oscillating mechanism is activated.

22. A magnetic disk drive according to claim 9, wherein the acceleration has a component perpendicular to a surface of said magnetic disk medium.

* * * * *

UNITED STATES PATENT AND TRADEMARK OFFICE
CERTIFICATE OF CORRECTION

PATENT NO. : 7,580,221 B2  Page 1 of 1
APPLICATION NO. : 11/106175
DATED : August 25, 2009
INVENTOR(S) : Sega et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 948 days.

Signed and Sealed this

Fourteenth Day of September, 2010

David J. Kappos
*Director of the United States Patent and Trademark Office*